US008366139B2

(12) United States Patent
 Kane

(10) Patent No.: US 8,366,139 B2
(45) Date of Patent: Feb. 5, 2013

(54) FOLDABLE FULL-FEATURED STROLLER CAPABLE OF MINIMIZING THE FOLDED SIZE OF THE STROLLER

(75) Inventor: Schantal Kane, Central (HK)

(73) Assignee: Wonderland Nurserygoods Company Limited, Central, Hong Kong (CN)

( * ) Notice: Subject to any disclaimer, the term of this patent is extended or adjusted under 35 U.S.C. 154(b) by 287 days.

(21) Appl. No.: 12/728,365

(22) Filed: Mar. 22, 2010

(65) Prior Publication Data

US 2010/0237590 A1  Sep. 23, 2010

Related U.S. Application Data

(60) Provisional application No. 61/210,856, filed on Mar. 23, 2009.

(51) Int. Cl.
*B62B 3/02* (2006.01)
*B60N 2/02* (2006.01)
*B60R 7/00* (2006.01)

(52) U.S. Cl. ........................................ 280/647; 280/650

(58) Field of Classification Search .................... 280/42, 280/639, 641, 642, 644, 647, 649, 650, 658, 280/47.38, 38; 297/16.1, 16.2, 31, 42, 55, 297/59
See application file for complete search history.

(56) References Cited

U.S. PATENT DOCUMENTS

| 1,695,409 | A | * | 12/1928 | Banks | 280/644 |
| 2,607,605 | A | * | 8/1952 | Lines | 280/644 |
| 3,100,652 | A | * | 8/1963 | Schenkman | 280/644 |
| 4,294,464 | A | * | 10/1981 | Ettridge | 280/649 |
| 4,834,403 | A | * | 5/1989 | Yanus et al. | 280/30 |
| 7,210,699 | B2 | * | 5/2007 | Lan | 280/642 |

* cited by examiner

*Primary Examiner* — J. Allen Shriver, II
*Assistant Examiner* — Bridget Avery
(74) *Attorney, Agent, or Firm* — McDermott Will & Emery LLP

(57) ABSTRACT

A stroller comprises a foldable stroller frame including two handle tubes, two front leg tubes connected respectively to lower ends of the handle tubes, and two rear leg tubes connected respectively and pivotally to the front leg tubes. Each of the handle tubes has upper and lower handle tube sections interconnected pivotally by a first joint. Each of the front leg tubes has upper and lower front leg tube sections interconnected pivotally by a second joint. Each of the lower handle tube sections is connected pivotally to the upper front leg tube section of the corresponding front leg tube and the corresponding rear leg tube by a third joint. Upon folding the stroller frame, an assembly of the handle tubes and the front leg tubes is folded in a Z-shaped manner.

8 Claims, 4 Drawing Sheets

FOLDABLE FULL-FEATURED STROLLER CAPABLE OF MINIMIZING THE FOLDED SIZE OF THE STROLLER

CROSS-REFERENCE TO RELATED APPLICATION

This application claims priority of U.S. provisional application No. 61/210,856, filed on Mar. 23, 2009.

BACKGROUND OF THE INVENTION

1. Field of the Invention

This invention relates to foldable strollers, and more particularly to a foldable full-featured stroller that is capable of minimizing the folded size of the stroller.

2. Description of the Related Art

Currently available strollers are classified into lightweight type and all-featured type based on consumer's need. A lightweight type stroller is lightweight, and is able to be folded into a compact size. Therefore, the lightweight type stroller is convenient to carry while traveling. The lightweight type stroller, however, has only one function, i.e., to transport a baby or small child. A full-featured stroller has many functions. To perform the functions, the full-featured stroller may include a child tray disposed in front of a seat, a storage basket disposed under the seat, a parent tray disposed adjacent to handles. Typically, the full-featured stroller has a robust stroller frame that can provide a better protection to the child occupant. The full-featured stroller, however, is heavy in weight, and is bulky in volume, so that it is not convenient to carry while traveling. Thus, it is desirable to provide a foldable full-featured stroller that is capable of minimizing the folded size of the stroller.

SUMMARY OF THE INVENTION

The object of this invention is to provide a foldable full-featured stroller that is convenient to carry.

According to this invention, there is provided a stroller comprising a foldable stroller frame, the stroller frame having two side portions, each of said side portions including:

a handle tube having an upper handle tube section, a lower handle tube section, and a first joint for connecting the upper handle tube section pivotally to the lower handle tube section in such a manner to limit pivoting movement of the upper handle tube section toward the lower handle tube section in a first direction;

a front leg tube disposed below the handle tube and having an upper front leg tube section, a lower front leg tube section, and a second joint for connecting the upper front leg tube section pivotally to the lower front leg tube section in such a manner to limit pivoting movement of the upper front leg tube section toward the lower front leg tube in the first direction;

a rear leg tube disposed behind the front leg tube; and a third joint for connecting the lower handle tube section of the handle tube pivotally to the upper front leg tube section of the front leg tube and the rear leg tube in such a manner to limit pivoting movement of the lower handle tube section of the handle tube and the rear leg tube toward the upper front leg tube section of the front leg tube in a second direction opposite to the first direction so that, upon folding the stroller frame, an assembly of the handle tube and the front leg tube is folded in a Z-shaped manner.

Since the assembly of the handle tube and the front leg tube is folded in the Z-shaped manner, the folded stroller is convenient to carry while traveling.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
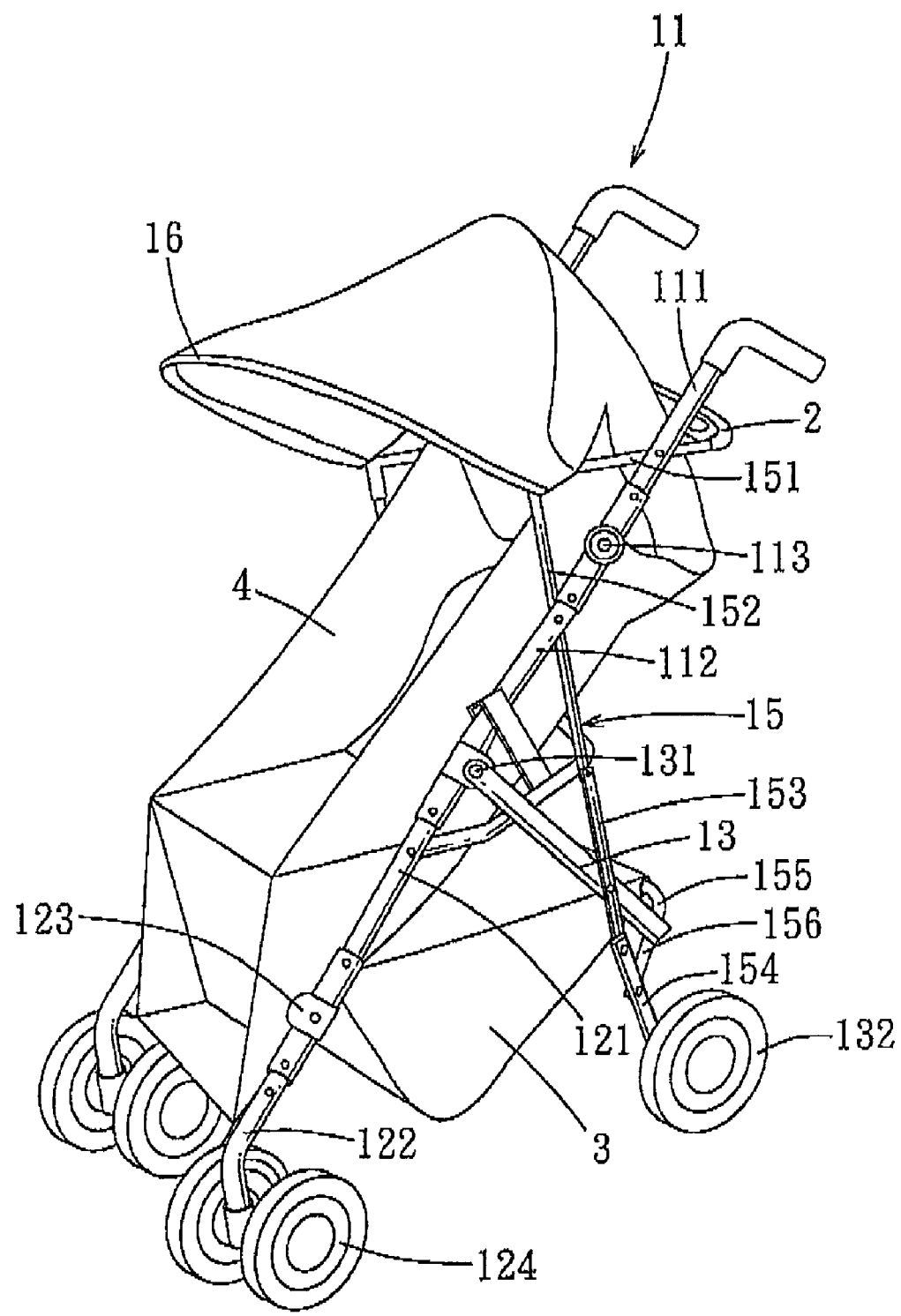
FIG. 1 is a perspective view of the preferred embodiment of a foldable full-featured stroller according to this invention.

Referring to FIG. 1, the preferred embodiment of a foldable full-featured stroller according to this invention is shown to include a foldable stroller frame 1, a parent tray 2, a storage basket 3, a covering 4 disposed on the stroller frame 1 and made of cloth, a loading seat 14, a linkage mechanism 15, and a canopy-supporting tube 16.

Figure 2:
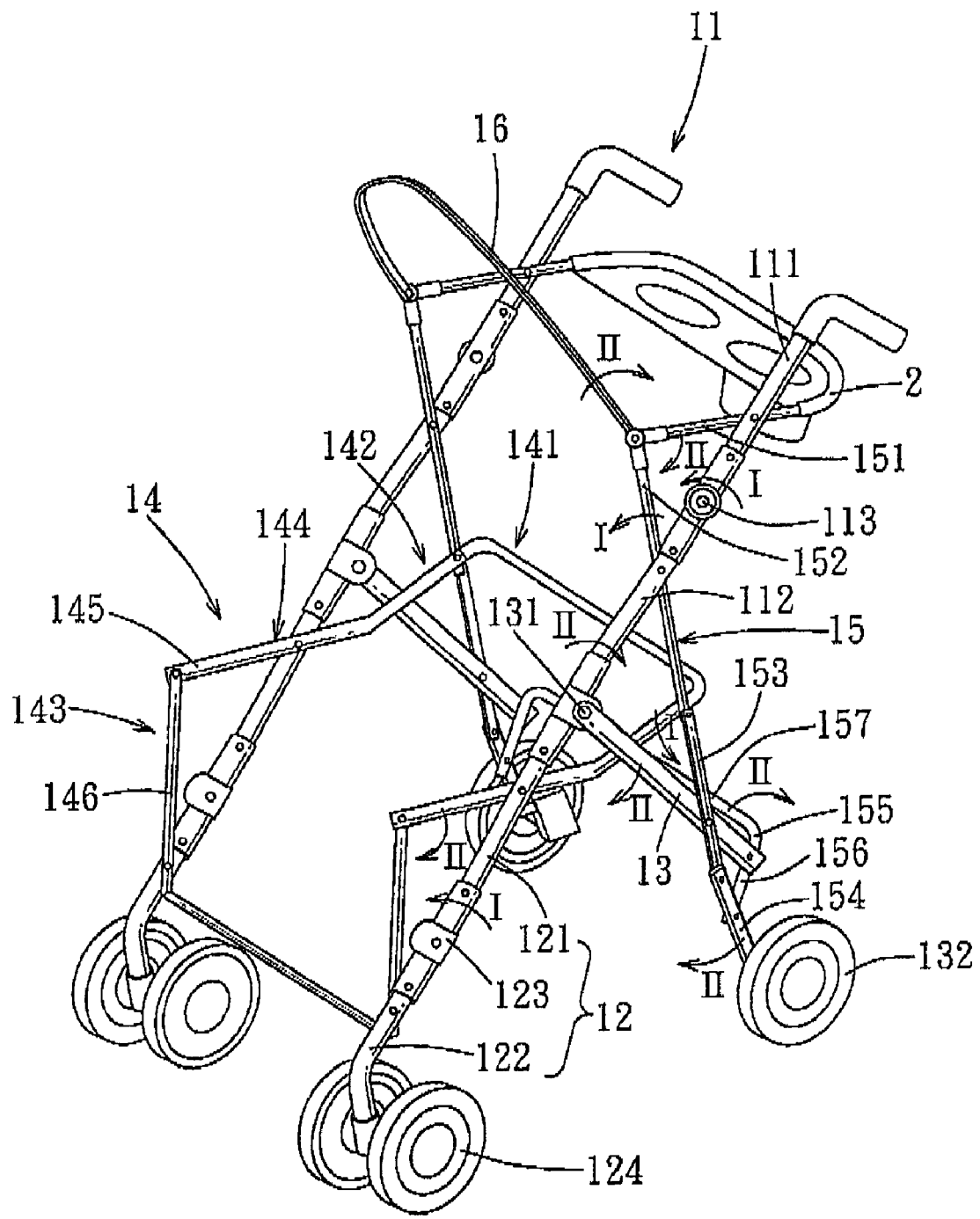
FIG. 2 is a fragmentary perspective view of the preferred embodiment.
Figure 3:
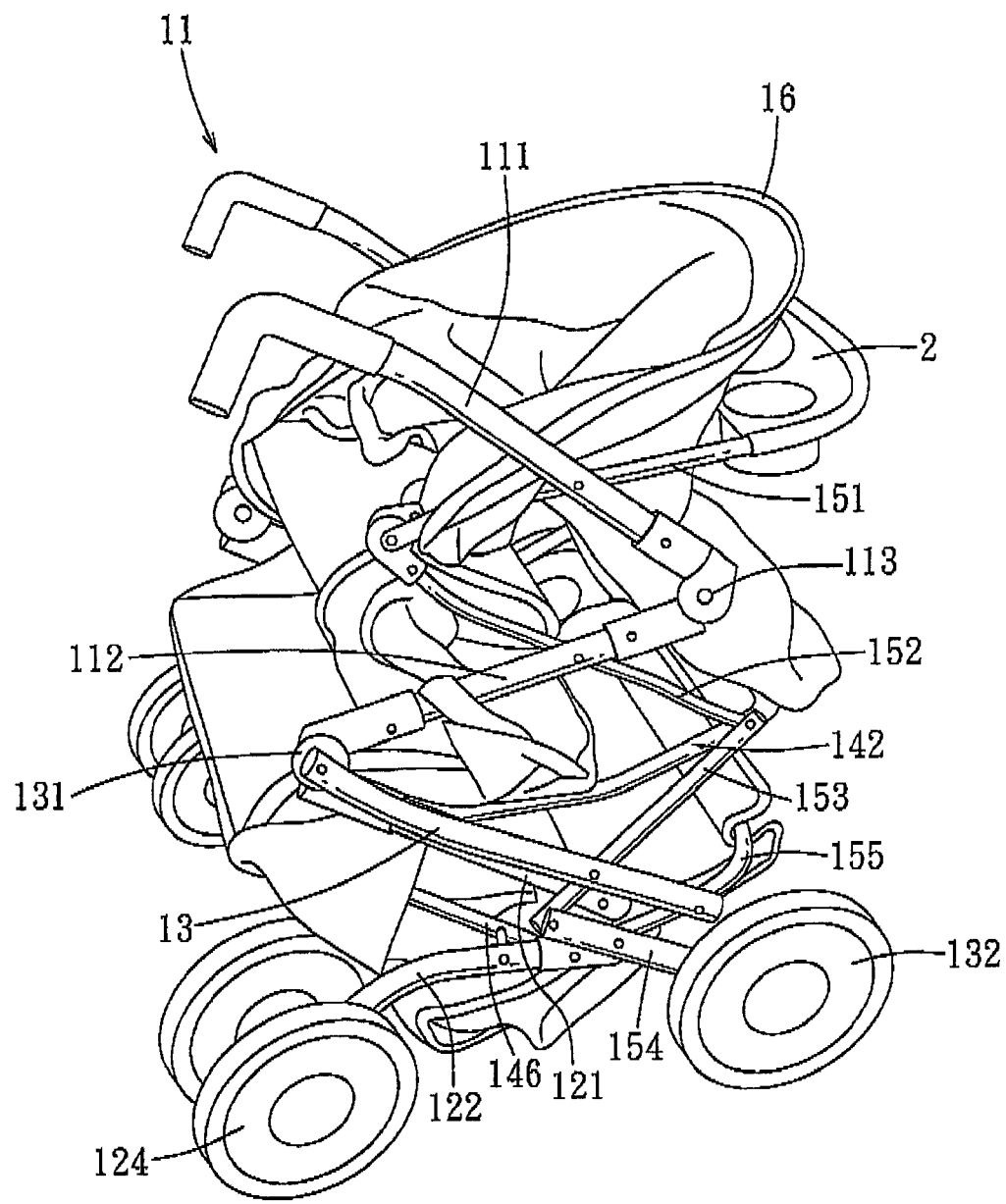
FIG. 3 is a perspective view of the preferred embodiment in a semi-folded state.

With further reference to FIGS. 2 and 3, the stroller frame 1 includes two handle tubes 11, two front leg tubes 12, and two rear leg tubes 13.

Each of the handle tubes 11 includes an upper handle tube section 111, a lower handle tube section 112, and a unidirectional first joint 113 for connecting the upper handle tube section 111 pivotally to the lower handle tube section 112 in such a manner to limit pivoting movement of the upper handle tube section 111 toward the lower handle tube section 112 in a first direction (I) (i.e., counterclockwise direction).

The front leg tubes 12 are disposed below the handle tubes 11. Each of the front leg tubes 12 includes an upper front leg tube section 121, a lower front leg tube section 122, and a unidirectional second joint 123 for connecting the upper front leg tube section 121 pivotally to the lower front leg tube section 122 in such a manner to limit pivoting movement of the upper front leg tube section 121 toward the lower front leg tube section 122 in the first direction (I). Each of the lower front leg tube sections 122 has a lower end mounted with a rotatable front wheel unit 124.

Each of the lower handle tube sections 112 is connected pivotally to the corresponding rear leg tube 13 and the corresponding upper front leg tube section 121 by a unidirectional third joint 131 in such a manner to limit pivoting movement of the corresponding lower handle tube section 112 and the corresponding rear leg tube 13 toward the corresponding upper front leg tube section 121 in a second direction (II) (i.e., clockwise direction) opposite to the first direction (I).

The loading seat 14 includes a seat frame 141. The seat frame 141 has an inclined backrest portion 142 and a seat portion 143. The backrest portion 142 is disposed behind the upper front leg tube sections 121. The seat portion 143 extends forwardly from the backrest portion 142, and includes two side tubes 144. Each of the side tubes 144 has a generally horizontal upper side tube section 145 connected pivotally to the corresponding upper front leg tube section 121, and an upright lower side tube section 146 disposed below and connected pivotally to the upper side tube section 145 and connected pivotally to the corresponding lower front leg tube section 122.

The linkage mechanism 15 includes two first connecting tubes 151, two second connecting tubes 152, two third connecting tubes 153, two fourth connecting tubes 154, and a fifth connecting tube 155.

Each of the first connecting tubes 151 has one end connected pivotally to the corresponding upper handle tube section 111. Each of the second connecting tubes 152 has one end connected pivotally to the other end of the corresponding first connecting tube 151, the other end connected pivotally to the inverted U-shaped backrest portion 142, and an intermediate portion connected pivotally to the corresponding lower handle tube section 112. Each of the third connecting tubes 153 has one end connected pivotally to the other end of the corresponding second connecting tube 152, and an intermediate portion disposed below the corresponding second connecting tube 152 and connected pivotally to the corresponding rear leg tube 13. Each of the fourth connecting tubes 154 has one end (i.e., upper end) connected pivotally to the other end of the corresponding third connecting tube 153, and the other end (i.e., lower end) mounted with a rotatable rear wheel unit 132. The fifth connecting tube 155 is U-shaped, and has two side arms 156, each of which is connected pivotally to the corresponding rear leg tube 13 at one end thereof, and to the corresponding fourth connecting tube 154 at the other end thereof.

With particular reference to FIG. 1, the canopy-supporting tube 16 is connected pivotally between the first connecting tubes 151.

A parent tray 2 is connected pivotally between the first connecting tubes 151, and is adjacent to the handle tubes 11.

A storage basket 3 is made of cloth, and is disposed between the front leg tubes 12 and the fifth connecting tube 155. A front end of the storage basket 3 is connected between the front leg tubes 12. A rear end of the storage basket 3 is disposed on a horizontal tube portion 157 of the fifth connecting tube 155.

With particular reference to FIGS. 2 and 3, when the stroller frame 1 is folded, the upper handle tube sections 111 are pivoted toward the lower handle tube sections 112 in the first direction (I) to thereby activate the first connecting tubes 151 to pivot toward the second connecting tubes 152 in the second direction (II). In addition, the canopy-supporting tube 16 is pivoted toward the first connecting tubes 151 in the second direction (II), and the lower handle tube sections 112 and the rear leg tubes 13 are pivoted toward the upper front leg tube sections 121 in the second direction (II) to activate the second connecting tubes 152 and the backrest portion 142 to pivot toward the third connecting tubes 153 in the first direction (I), thereby moving the backrest portion 142 toward the rear leg tubes 13. Relative movement of the third connecting tubes 153 and the rear leg tubes 13 results in pivoting movement of the fourth connecting tubes 154 toward the fifth connecting tubes 155 in the second direction (II), which leads to movement of the rear wheel units 132 toward the front wheel units 124. Further, the upper front leg tube sections 121 are pivoted toward the lower front leg tube sections 122 in the first direction (I) to thereby activate the upper side tube sections 145 to pivot toward the lower side tube sections 146 in the second direction (II). As such, upon folding the stroller frame 1, an assembly of the handle tubes 11 and the front leg tubes 12 is folded in a Z-shaped manner to minimize the folded size of the stroller frame 1.

Figure 4:
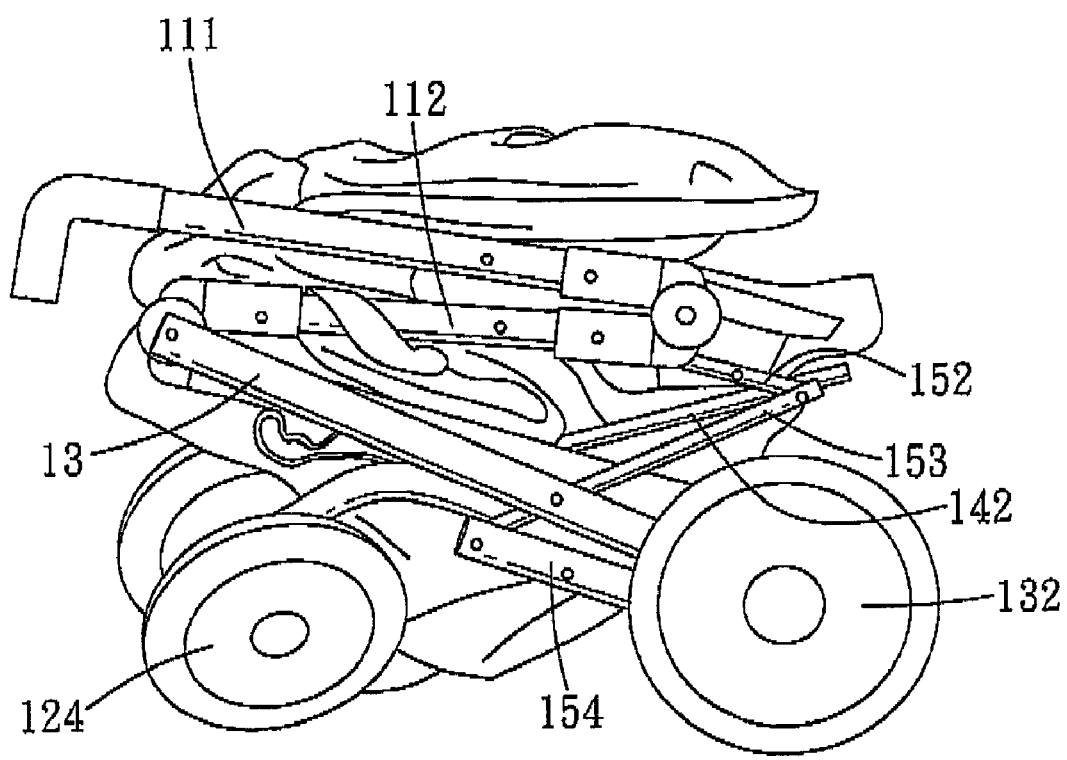
FIG. 4 is a perspective view of the preferred embodiment in a fully folded state.

With particular reference to FIG. 4, when the stroller 1 is fully folded, the rear wheel units 132 are moved toward the front wheel units 124 so that the distance between the front wheel units 124 and the rear wheel units 132 and, thus, the length of the stroller 1 in a front-to-rear direction are reduced largely. Hence, the space occupied by the folded stroller 1 is relatively small. Furthermore, the front and rear wheel units 124, 132 of the folded stroller 1 can contact the ground surface so that the folded stroller 1 is easy to move. As a result, the folded stroller 1 is convenient to carry while traveling. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A stroller comprising a foldable stroller frame, said stroller frame having two side portions, each of said side portions including:
    a handle tube having an upper handle tube section, a lower handle tube section, and a first joint for connecting said upper handle tube section pivotally to said lower handle tube section in such a manner to limit pivoting movement of said upper handle tube section toward said lower handle tube section in a first direction when folding said stroller;
    a front leg tube disposed below said handle tube and having an upper front leg tube section, a lower front leg tube section, and a second joint for connecting said upper front leg tube section pivotally to said lower front leg tube section in such a manner to limit pivoting movement of said upper front leg tube section toward said lower front leg tube in the first direction when folding said stroller;
    a rear leg tube disposed behind said front leg tube; and
    a third joint for connecting said lower handle tube section of said handle tube pivotally to said upper front leg tube section of said front leg tube and said rear leg tube in such a manner to limit pivoting movement of said lower handle tube section of said handle tube and said rear leg tube toward said upper front leg tube section of said front leg tube in a second direction opposite to the first direction when folding said stroller so that, upon folding said stroller frame, an assembly of said handle tube and said front leg tube is folded in a Z-shaped manner.

2. The stroller as claimed in claim 1, further comprising a loading seat including a seat frame, said seat frame including:
    an inverted U-shaped backrest portion disposed behind said upper front leg tube sections of said front leg tubes; and
    a seat portion extending forwardly from said backrest portion and including two side tubes each having a generally horizontal upper side tube section connected pivotally to said upper front leg tube section of a corresponding one of said front leg tubes, and an upright lower side tube section disposed below and connected pivotally to said upper side tube section and connected pivotally to said lower front leg tube section of the corresponding one of said front leg tubes.

3. The stroller as claimed in claim 2, further comprising a linkage mechanism that includes:
    two first connecting tubes each having one end connected pivotally to said upper handle tube section of a corresponding one of said handle tubes of said side portions;
    two second connecting tubes each having one end connected pivotally to the other end of a corresponding one of said first connecting tubes, and the other end connected pivotally to said inverted U-shaped backrest portion of said seat frame; and
    two third connecting tubes each having one end connected pivotally to the other end of a corresponding one of said second connecting tubes, each of said third connecting tubes being connected pivotally to a corresponding one of said rear leg tubes of said side portions at a position below the corresponding one second connecting tubes such that, upon folding said stroller frame, the corresponding one of said first connecting tubes is pivoted toward the corresponding one of said second connecting tubes in the second direction, and the corresponding one of aid second connecting tubes is pivoted toward a corresponding one of said third connecting tubes in the first direction to thereby move said backrest portion toward said rear leg tubes.

4. The stroller as claimed in claim 3 wherein each of said lower front leg tube sections has a lower end mounted with a front wheel unit.

5. The stroller as claimed in claim 3, further comprising a tray connected between said first connecting tubes.

6. The stroller as claimed in claim 3, further comprising a canopy-supporting tube connected pivotally to said first connecting tubes such that, upon folding said stroller frame, said canopy-supporting tube is pivoted toward said first connecting tubes.

7. The stroller as claimed in claim 4, wherein said linkage mechanism further includes:
   two fourth connecting tubes having upper ends connected respectively and pivotally to said third connecting tubes, and lower ends mounted with two rear wheel units, respectively; and
   a U-shaped fifth connecting tube having two side arms, each of which is connected pivotally to the corresponding one of said rear leg tubes at one end thereof, and to a corresponding one of said fourth connecting tubes at the other end thereof such that, upon folding said stroller frame, said fifth connecting tube and the corresponding one of said fourth connecting tubes are pivoted toward the corresponding one of said rear leg tubes in the second direction.

8. The stroller as claimed in claim 7, further comprising a storage basket disposed between said front leg tubes and said fifth connecting tube.

* * * * *